United States Patent Office 3,515,595
Patented June 2, 1970

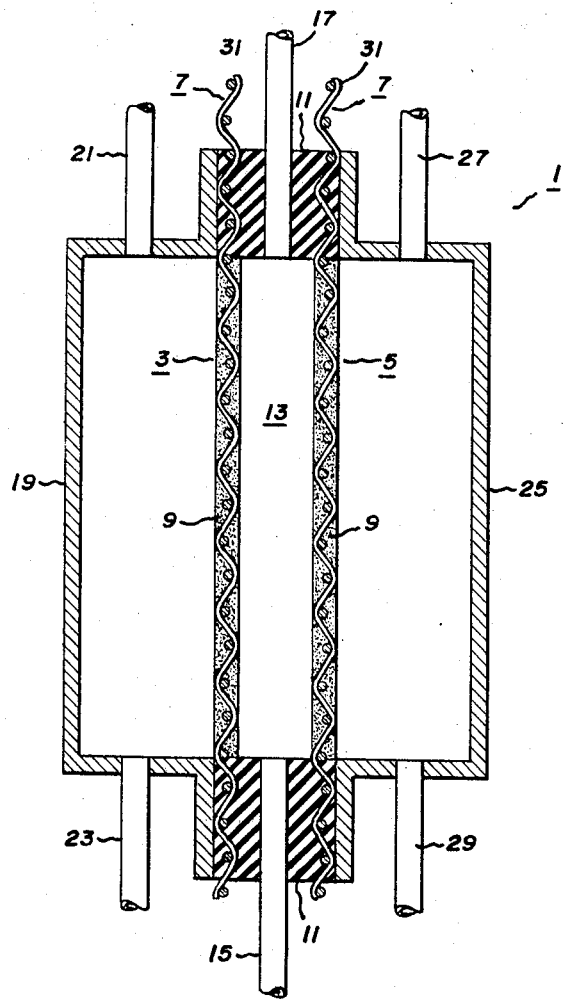

3,515,595
CURRENT COLLECTORS FOR CELLS UTILIZING HOT ACID ELECTROLYTES
Robert A. Sanford, Marblehead, Essex, Mass., assignor to General Electric Company, a corporation of New York
Filed Aug. 9, 1967, Ser. No. 659,431
Int. Cl. H01m 13/00
U.S. Cl. 136—120                              12 Claims

ABSTRACT OF THE DISCLOSURE

The invention is directed to current collectors comprised of ternary alloys consisting essentially of nickel, palladium, and gold. For cells utilizing a hot phosphoric acid electrolyte the alloy preferably consists essentially of 50 to 80 percent nickel, at least 5 percent palladium, and at least 2 percent gold, on a weight basis. For cells utilizing hot sulfuric acid or sulfonic acid polymer electrolyte the alloy preferably consists essentially of from 30 to 50 percent nickel, at least 30 percent palladium, and at least 5 percent gold, on a weight basis. Fuel cells provide a preferred application.

---

My invention relates to current collectors useful with cells utilizing hot acid electrolytes.

The composition of the active mass making up an electrode structure must be electronically conductive in order to transfer electrons with respect to the external electrical circuit to which the electrode is attached. The selection of an active mass composition is the result of balancing a number of considerations relating to the chemical and physical properties of the active mass. In most instances electronic conductivity does not approach the conductivity of good metal conductors. To minimize internal resistive losses within the electrode structure it is conventional practice to associate with the active mass in an electrode structure a metallic component having a high electronic conductivity. This component, referred to as a current collector, may take any of a variety of structural forms. In its simplest form an electrode current collector may be a metallic sheet or plate. In most instances current collectors are of foraminous construction. Conventional current collectors include screens, perforated sheets, sintered plaques, expanded metal, foamed metal, felt metal, and other similar structures. In some electrode structures the function of current collecting may be performed by metal particles blended with the active mass.

In addition to electronic conductivity, a good current collector material should additionally be readily available at low cost and should be resistant to corrosion both when the cell is in and out of service. In many electrode constructions the current collector forms the skeletal structure of the electrode, and in these applications it is desirable to form the current collector of a metal that exhibits substantial structural strength. In many electrode applications it is desirable that the weight be maintained at a minimum. Accordingly, as between materials meeting all other criteria those of lower weight are generally preferred.

The art has encountered considerable difficulty with regard to current collectors to be used in cells incorporating an acid electrolyte intended to be maintained above ambient temperatures. Fuel cells, for example, commonly incorporate sulfuric acid, phosphoric acid, or sulfonic acid polymer as the electrolyte. The sulfuric and sulfonic acid electrolytes are commonly maintained at temperatures approaching the boiling point of water or somewhat above while phosphoric acid electrolyte is frequently maintained considerably above the boiling point of water. Few metals possess the requisite characteristics to be used in such corrosive environments. To date current collectors for acid electrolyte cells operating above ambient temperatures have been formed for the most part of noble metals such as gold and platinum, neither of which corrode in commonly used hot acids. The obvious disadvantage of using these metals is that they are quite expensive. They are also very dense, adding considerably to the weight of the cells in which they are included. Gold also suffers the disadvantage of being relatively soft.

Probably the only completely non-noble current collectors for acid electrolyte fuel cells have been formed of tantalum. While tantalum is a suitable current collector material for many applications, it suffers the disadvantage for fuel cell applications in that it is subject to embrittlement when exposed to hydrogen for extended periods of time.

Attempts to isolate useful binary alloys of noble metals and non-noble metals for use as current collectors have proven generally unsuccessful, except where the non-noble metal content is limited to minor amounts. One of the few binary noble and non-noble metal alloys finding application in fuel cells, titanium-palladium alloy, corrodes rapidly in hot phosphoric acid and corrodes at higher than acceptable rates in hot sulfuric acid.

It is an object of my invention to provide a current collector incorporating an alloy of a base metal useful in a cell having an acid electrolyte maintained above ambient temperature.

It is a more specific object to provide a base metal alloy containing current collector which possesses utility in combination with hot sulfuric and sulfonic acid electrolytes.

It is another specific object to provide a base metal alloy containing current collector which possesses utility in combination with hot phosphoric acid electrolyte.

It is a further object to provide a base metal alloy containing current collector possessing utility in a hydrogen electrode.

In a cell having an acid electrolyte maintained above ambient temperature during operation and a current collector in contact with the electrolyte, my invention is directed to the improvement in which the current collector is comprised of an alloy consisting essentially of nickel, palladium, and gold. As a species, in a cell having phosphoric acid electrolyte maintained at a temperature above the boiling point of water and a current collector in contact with the electrolyte, my invention is directed to the improvement in which the current collector is comprised of an alloy consisting essentially of from 50 to 80 percent by weight nickel, at least 5 percent by weight palladium, and at least 2 percent by weight gold. As a second species, in a cell having an acid electrolyte chosen from the group consisting of sulfuric and sulfonic acids and a current collector in contact with the electrolyte, my invention is directed to the improvement in which the current collector is comprised of an alloy consisting essentially of from 30 to 50 percent by weight nickel, at least 30 percent by weight palladium, and at least 5 percent by weight gold.

My invention may be better understood by reference to the following detailed description considered in conjunction with the drawing, in which a fuel cell is shown in vertical section.

It is my discovery that current collectors formed of ternary alloys consisting essentially of nickel, palladium, and gold remain corrosion resistant when placed in contact with hot acids in a cell environment to a substantially higher degree than current collectors formed of binary alloys consisting essentially of corresponding amounts of nickel. Current collectors formed of ternary alloys consisting essentially of nickel, palladium, and gold are more corrosion resistant to hot acids than are current collectors formed of binary alloys consisting essentially of nickel and palladium or binary alloys consisting essentially of nickel and gold. Further, they are more corrosion resistant than current collectors of other ternary alloys which might be expected to exhibit a like degree of corrosion resistance, such as alloys consisting essentially of nickel, palladium, and platinum. Attempts to anodically corrode current collectors formed of nickel-palladium-gold ternary alloys in hot acids indicate that the corrosion resistant properties are not adversely affected in an environment such as is encountered in a hot acid electrolyte cell.

I recognized current collectors formed according to my invention to possess utility with hot acid electrolyte cells generally. I specifically recognize that my current collectors fulfil a long standing need in fuel cells. Typically fuel cells have incorporated platinum or gold current collectors. Current collectors formed according to my invention comprised of alloys consisting essentially of nickel, palladium, and gold are less expensive than either platinum or gold current collectors. Further, both the nickel and palladium content, which together will in most instances account for the major part of the current collector, cause the current collector to be lighter and stronger than conventional current collectors.

The most widely used acid electrolytes employed in fuel cells are phosphoric acid electrolytes, sulfonic acid polymer electrolytes, and sulfuric acid electrolytes. Sulfonic acid polymer and sulfuric acid electrolytes are quite similar in their operating temperatures and corrosion properties. These electrolytes are typically utilized in a temperature range of from ambient temperature to the boiling point of water and may occasionally be used at somewhat higher temperatures. Phosphoric acid electrolytes may be used at temperatures ranging from ambient to 250° C. and above.

To provide specific illustrations, a plurality of alloy samples listed in Table I were tested in 85 to 90 percent by weight phosphoric acid at 400° F. The proportion of elements in each alloy are indicated in parts by weight. All of the alloys were tested for a period of 161 hours, except the 70 palladium-30 nickel alloy, which was tested for 90.5 hours. All alloy samples were in the form of disks having an exposed surface area of 11.0 cm.$^2$, except the 70 palladium-30 nickel alloy, which was in the form of a sheet having an initial surface area of 20.17 cm.$^2$. The alloys are listed in order of decreasing corrosion resistance. By far the most superior alloy tested was comprised of 75 percent by weight nickel. The ternary alloys of nickel, palladium, and gold containing from 50 to 75 percent by weight nickel were noted to be markedly superior to the remaining alloys. This is quite surprising when it is considered that the binary alloy consisting of 70 percent by weight palladium and only 30 percent by weight nickel corroded at five times the rate of the nickel-palladium-gold ternary alloy. It is also surprising that the ternary alloy of nickel, palladium, and platinum was not as corrosion resistant as the corresponding ternary alloy samples including gold. It is noted that the sample containing 80 percent nickel, 15 percent palladium, and 5 percent gold was of intermediate corrosion resistance.

TABLE I

| Alloy tested, wt. percent | Corrosion Rate | |
|---|---|---|
| | Mg./ft.$^2$, day | Mil/year |
| 75 Ni-20 Pd-5 Au | 15 | 0.255 |
| 75 Ni-15 Pd-10 Au | 15 | 0.820 |
| 50 Ni-45 Pd-5 Au | 56 | 0.795 |
| 50 Ni-40 Pd-10 Au | 62.4 | 0.864 |
| 80 Ni-15 Pd-5 Au | 127 | 1.98 |
| 80 Ni-15 Pd-5 Pt | 175 | 2.7 |
| 75 Ni-15 Pd-10 Pt | 255 | 3.25 |
| 70 Pd-30 Ni | 283 | 3.96 |

To confirm the corrosion resistance of the tested alloys in a cell environment, the samples were individually tested using 97 percent by weight phosphoric acid at 400° F. as an electrolyte. The same counter electrode was used for each test. Various potentials and currents were applied between the sample used as an anode and the counter electrode. In all instances the corrosion rate was considered sufficiently low as to allow utilization of the sample as a current collector in a cell.

TABLE II

| Alloy tested, wt. percent | Potential, volts | Current, ma. | Wt. loss, mg./hr. | Test time, hours |
|---|---|---|---|---|
| 80 Ni-15 Pd-5 Au | −.26 | 0 | 0 | |
| | .12 | 0.15 | 2.8 | 3 |
| | .32 | .30 | 0.2 | 3 |
| | .50 | .24 | 0.6 | 3 |
| | 1.00 | .45 | 1.0 | 3 |
| 80 Ni-15 Pd-5 Pt | −.26 | 0 | 0 | |
| | .10 | .03 | 1.2 | 3 |
| | .30 | .03 | 0.4 | 3 |
| | .51 | .15 | 0.6 | 3 |
| | 1.00 | .45 | 0.63 | 3 |
| 75 Ni-20 Pd-5 Au | −.52 | 0 | | |
| | .16 | .21 | 1.1 | 3 |
| | .37 | .20 | 0.37 | 3 |
| | .50 | .15 | 2.8 | 3 |
| | 1.00 | .50 | 0.9 | 3 |
| 75 Ni-15 Pd-10 Au | −.43 | 0 | | |
| | .17 | .14 | 7.1 | 3 |
| | .35 | .20 | 0.63 | 3 |
| | .50 | .15 | 1.4 | 3 |
| | 1.00 | .90 | 1.3 | 3 |
| 50 Ni-45 Pd-5 Au | −.24 | 0 | | |
| | .13 | .10 | 0.43 | 3 |
| | .32 | .03 | 0.1 | 3 |
| | .50 | .18 | 0.2 | 3 |
| | 1.00 | .40 | 0.5 | 3 |
| 50 Ni-40 Pd-10 Au | −.22 | 0 | | |
| | .10 | .05 | 0.4 | 3 |
| | .31 | .02 | 0.07 | 3 |
| | .49 | .09 | 0.1 | 3 |
| | .98 | .28 | 0.3 | 3 |

Based on various corrosion tests including those set out above, I have determined that outstanding current collectors for use with hot phosphoric acid electrolytes are those comprised of ternary alloys consisting essentially of nickel, palladium, and gold—the nickel being present in a weight range of from 50 to 80 percent, the palladium being present in an amount of at least 5 percent, and the gold being present in an amount of at least 2 percent. Preferred ternary alloys are those consisting of essentially 75 to 50 percent by weight nickel, at least 15 percent palladium, and at least 5 percent gold.

Table III provides a results of corrosion tests conducted using 3 N sulfuric acid at 190° F. All tests were conducted over a time period of 165 hours. All of the samples tested were in the form of disks having a surface area of 4.81 cm.$^2$, except the 90 Pd-10 Ni alloy sample which was in the form of a sheet having a surface area of 20.2 cm.$^2$. It is noted that the ternary alloys of nickel, palladium, and gold which contain 50 percent by weight nickel exhibited superior corrosion resistance. Surprisingly the corrosion resistance of these samples was noted to exceed the corrosion resistance of the binary alloy sample containing only 10 percent by weight nickel and the remainder noble metal. Also, it is again apparent that ternary alloys of nickel, palladium, and gold are superior to the corresponding alloys of nickel, palladium, and platinum.

TABLE III

| Alloy Tested wt. percent: | Corrosion Rate, mg./ft.$^2$-day |
|---|---|
| 50 Ni-45 Pd-5 Au | 90.5 |
| 50 Ni-40 Pd-10 Au | 75 |
| 90 Pd-10 Ni | 143 |
| 80 Ni-15 Pd-5 Au | 366 |
| 75 Ni-15 Pd-10 Au | 665 |
| 75 Ni-20 pd-5 Au | 558 |
| 80 Ni-15 Pd-5 Pt | 710 |

To confirm adequate corrosion resistance in a cell environment, anodic corrosion tests were performed on the alloy samples similarly as described with reference to Table II, except that 3 N sulfuric acid at 190° F. was used as the electrolyte. Test results are set out in Table IV. In each instance the samples were noted to be sufficiently corrosion resistant to allow cell application as a current collector.

TABLE IV

| Alloy tested, wt. percent | Potential, volts | Current, ma. | Wt. loss, mg./hr. | Test time, hours |
|---|---|---|---|---|
| 80 Ni-15 Pd-5 Au | -0.3 | 0 | | |
| | 0.1 | 0.15 | 0.3 | 3 |
| | 0.3 | 0.26 | 0.43 | 3 |
| | 0.5 | 3.0 | 5.2 | 3 |
| | 1.0 | 32 | 34 | 3 |
| 80 Ni-15 Pd-5 Pt | -0.3 | 0 | | |
| | 0.1 | 0.13 | 0.4 | 3 |
| | 0.3 | 0.52 | 0.7 | 3 |
| | 0.5 | 13.4 | 13.4 | 3 |
| | 1.0 | 62.5 | 59 | 3 |
| 75 Ni-20 Pd-5 Au | -.217 | 0 | | |
| | 0.1 | 0.2 | 0.5 | 3 |
| | 0.3 | 0.2 | 0.3 | 3 |
| | 0.5 | 4.5 | 5.3 | 3 |
| | 1.0 | 48 | 51.2 | 3 |
| 75 Ni-15 Pd-10 Au | -0.3 | 0 | | |
| | 0.1 | 0.2 | 0.56 | 3 |
| | 0.3 | 0.22 | 0.5 | 3 |
| | 0.5 | 5.9 | 7 | 3 |
| | 1.0 | 16.4 | 54 | 3 |
| 50 Ni-45 Pd-5 Au | -0.25 | 0 | | |
| | 0.1 | 0.1 | 0.2 | 3 |
| | 0.3 | 0.08 | 0.2 | 3 |
| | 0.5 | 0.18 | 0.27 | 3 |
| | 1.0 | 12.1 | 18.4 | 3 |
| 50 Ni-40 Pd-10 Au | -0.13 | 0 | | |
| | 0.1 | Low | 0.07 | 3 |
| | 0.3 | 0.08 | 0.26 | 3 |
| | 0.5 | 0.2 | 0.2 | 3 |
| | 1.0 | 20 | 20 | 3 |

Based on various corrosion tests including those set out above, I have determined that outstanding current collectors for use with hot sulfuric acid and sulfonic acid polymer electrolytes are those comprised of ternary alloys consisting essentially of nickel palladium, and gold—the nickel being present in a weight range of from 30 to 50 percent, the palladium being present in an amount of at least 30 percent, and the gold being present in an amount of at least 5 percent. Preferred ternary alloys are those consisting essentially of 30 to 50 percent nickel, at least 40 percent palladium, and at least 5 percent gold, on a weight basis.

To illustrate a specific, preferred embodiment of my invention, a fuel cell 1 is shown in vertical section in the drawing. The fuel cell is made up of an anode or fuel electrode 3 and a cathode or oxidant electrode 5. Each electrode is comprised of a current collector 7 formed according to my invention. In this instance both current collectors are shown formed as woven screens, but it is recognized that other foraminous current collector configurations may be substituted. The center portion of each electrode is loaded with a catalytically active mass 9, as is well understood in the art. The peripheral portions of the current collectors extending beyond the active masses are filled with an insulating and sealing gasket material 11 that forms an electrolyte gasket holding the electrodes in spaced relation. The electrolyte gasket and electrodes cooperate to form an electrolyte chamber 13. Electrolyte is circulated to and from the electrolyte chamber through electrolyte conduits 15 and 17 mounted by the gasket. A fuel housing member 19 seals against the electrode 3 to permit fuel to be brought into contact with the anode. A conduit 21 sealingly cooperates with the housing member to permit delivery of fuel to the anode, while an optional conduit 23 is provided to allow purging of the housing member of inerts. An optional housing member 25 is provided to allow oxidant to contact with electrode 5 and optional conduits 27 and 29 are provided for circulation of oxidant. Where hydrogen is employed as a fuel, it is recognized that conduit 23 may be entirely omitted, and where ambient air is to be utilized as an oxidant, the housing member 25 or its conduits may be entirely omitted. The current collectors are shown provided with upstanding integral portions 31 to permit ready connection of the current collectors in an electrical circuit.

In operation, an acid electrolyte may be circulated to the fuel cell 1 using conduits 15 and 17 while a fuel such as hydrogen is circulated to the housing member 19 using conduits 21 and 23 and oxidant is circulated to the housing member 25 using conduits 27 and 29. If an electrical load is connected to the portions 31 of the current collectors 7, an electrical current can be drawn from the fuel cell. Since the open circuit potential of a fuel cell is around one volt, the potential under load will be less than one volt. The acid electrolyte of the cell will be maintained at a temperature above ambient due to the internal resistive losses within the electrolyte while a current is being drawn. In some applications the electrolyte may be maintained at an elevated temperature because either the fuel or oxidant are introduced at elevated temperatures. In still other applications the fuel cell may be contained in an oven or thermal insulation to insure its operating at a desired elevated temperature.

If the current collectors are formed of ternary alloys of nickel, palladium, and gold, they will remain more resistant to corrosion than would current collectors formed of most other non-noble metal alloys. Further, the current collectors do not suffer the problem of embrittlement associated with tantalum current collectors.

While I have described my invention with reference to certain preferred embodiments, it is appreciated that numerous applications, variations, and modifications will readily occur to those skilled in the art. For example, while I have disclosed my invention with particular reference to fuel cells and common acid electrolytes therefor, it is recognized that my invention could be applied to any current collector configuration for use in any type of cell or battery of cells utilizing a hot acid electrolyte. It is accordingly intended that the scope of my invention be determined with reference to the following claims.

What I claim and desire to secure by Letters Patent of the United States is:

1. A cell having a gas consuming electrode and a phosphoric acid electrolyte maintained at a temperature below the boiling point of water and a highly corrosion resistant current collector in contact with the electrolyte, the improvement comprising a current collector which is a ternary alloy consisting of from 50 to 80 percent by weight nickel, at least 5 percent by weight palladium, and at least 2 percent by weight gold.

2. A cell as recited by claim 1 in which the alloy consists of from 50 to 75 percent by weight nickel, at least 15 percent by weight palladium, and 5 percent by weight gold.

3. A cell as recited by claim 1 in which the alloy consists of 75 percent by weight nickel, 20 percent by weight palladium, and 5 percent by weight gold.

4. A cell as recited by claim 1 in which the alloy consists of 75 percent by weight nickel, 15 percent by weight palladium, and 10 percent by weight gold.

5. A cell as recited by claim 1 in which the alloy consists of 50 percent by weight nickel, 45 percent by weight palladium, and 5 percent by weight gold.

6. A cell as recited by claim 1 in which the alloy consists of 50 percent by weight nickel, 40 percent by weight palladium, and 10 percent by weight gold.

7. A cell having a gas consuming electrode and an acid electrolyte chosen from the group consisting of sulfuric and sulfonic acids and a highly corrosion resistant current collector in contact with the electrolyte the improvement comprising a current collector which is a ternary alloy consisting of from 30 to 50 percent by weight nickel, at least 30 percent by weight palladium, and at least 5 percent by weight gold.

8. A cell as recited in claim 7 in which the alloy consists of from 30 to 50 percent by weight nickel, at least 40 percent by weight palladium, and at least 5 percent by weight gold.

9. A cell as recited by claim 7 in which the alloy consists of 50 percent by weight nickel, 45 percent by weight palladium, and 5 percent by weight gold.

10. A cell as recited by claim 7 in which the alloy consists of 50 percent by weight nickel, 40 percent by weight palladium, and 10 percent by weight gold.

11. The combination as recited by claim 1 in which the cell having gas-consuming electrode is a fuel cell having spaced gas-consuming electrodes in contact with the electrolyte.

means for directing hydrogen into contact with one of the gas-consuming electrodes, and the current collector being associated with the hydrogen electrode.

12. The combination as recited by claim 7 in which the cell having gas-consuming electrodes is a fuel cell having spaced gas-consuming electrodes in contact with the electrolyte, means for directing hydrogen into contact with one of the gas-consuming electrodes, and the current collector being associated with the hydrogen electrode.

References Cited

UNITED STATES PATENTS

| | | |
|---|---|---|
| 2,358,326 | 9/1944 | Hensel et al. |
| 3,113,048 | 12/1963 | Thompson. |
| 3,148,053 | 9/1964 | Spaletta _____ 75—170 |
| 3,203,834 | 8/1965 | Breiner. |
| 3,235,473 | 2/1966 | Leduc. |
| 3,297,489 | 1/1967 | I-Ming Feng et al. |
| 3,332,806 | 7/1967 | Teller et al. |
| 3,343,990 | 9/1967 | Griddy. |

WINSTON A. DOUGLAS, Primary Examiner

C. F. LE FEVOUR, Assistant Examiner

U.S. Cl. X.R.

136—86